(12) United States Patent
Yoneda

(10) Patent No.: US 7,653,686 B2
(45) Date of Patent: Jan. 26, 2010

(54) CONTENT REPRODUCING DEVICE AND CONTENT REPRODUCING METHOD

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 11/435,781

(22) Filed: May 18, 2006

(65) Prior Publication Data

US 2006/0277276 A1 Dec. 7, 2006

(30) Foreign Application Priority Data

May 19, 2005 (JP) .............................. 2005-147105

(51) Int. Cl.
*G06F 15/16* (2006.01)
(52) U.S. Cl. ........................ 709/203; 709/231; 709/236; 725/94; 725/105; 725/116
(58) Field of Classification Search ................. 709/231, 709/236, 237, 246, 219, 203; 725/94, 105, 725/116
See application file for complete search history.

(56) References Cited

U.S. PATENT DOCUMENTS 5,587,978 A * 12/1996 Endo et al. ............. 369/124.01

(Continued)

FOREIGN PATENT DOCUMENTS

CN 1191653 8/1998

(Continued)

OTHER PUBLICATIONS

Schulzrinne et al., "Draft-ietf-mmusic-rfc2326bis-08:Real Time Streaming Protocol (RTSP)" IETF Internet Draft, Oct. 25, 2004, pp. 1-176, p. 53, paragraph 11.5-p. 57, paragraph 11.6.

(Continued)

*Primary Examiner*—Nathan J Flynn
*Assistant Examiner*—Mohammad A Siddiqi
(74) *Attorney, Agent, or Firm*—Finnegan, Henderson, Farabow, Garrett & Dunner, L.L.P.

(57) ABSTRACT

Disclosed is a content reproducing device and a content reproducing method capable of quickly starting reproduction by making a pause state before starting the reproduction. The present invention provides a content reproducing device which requests content data of a desired content from a server storing content data and reproduces the content while receiving the content data requested, which includes a communication section which requests desired content data from the server and receives the content data, a receive buffer which buffers the content data received by the communication section, a reproducing section which reads the content data buffered in the receive buffer and reproduces the content, and a control section which controls reproduction of the content, wherein when a stop state in which reproduction of a content is stopped is switched to a pause state in which the reproduction of the content is paused, the control section lets the communication section request the content data from the server to receive the content data, lets the receive buffer a constant volume of the content data, and also lets the reproducing section stop reading the content data from the receive buffer.

9 Claims, 6 Drawing Sheets

U.S. PATENT DOCUMENTS

| | | | |
|---|---|---|---|
| 5,873,022 A | 2/1999 | Huizer et al. | |
| 6,018,506 A * | 1/2000 | Okabe et al. | 369/30.23 |
| 6,754,715 B1 | 6/2004 | Cannon et al. | |
| 6,901,462 B2 * | 5/2005 | Minoshima et al. | 710/29 |
| 2002/0057893 A1 * | 5/2002 | Wood et al. | 386/46 |
| 2004/0267952 A1 * | 12/2004 | He et al. | 709/231 |

FOREIGN PATENT DOCUMENTS

| | | |
|---|---|---|
| JP | 8-138354 | 5/1996 |
| JP | 2000-134371 | 5/2000 |
| JP | 2002-91863 | 3/2002 |
| JP | 2002-215516 | 8/2002 |
| JP | 2004-140610 | 5/2004 |
| JP | 2004-320660 | 11/2004 |
| JP | 2004-356829 | 12/2004 |
| JP | 2005-51794 | 2/2005 |

OTHER PUBLICATIONS

Notice on First Office Action, dated Sep. 5, 2008, from the Shanghai Patent and Trademark Law Office, with English language translation, total of 12 pages.

* cited by examiner

| Content No. | Content Name | Content type | Sampling frequency | Number of channels | Bit number | URL |
|---|---|---|---|---|---|---|
| 1 | ... | PCM | ... | ... | ... | ... |
| 2 | ... | PCM | ... | ... | ... | ... |
| 3 | ... | MP3 | ... | ... | ... | ... |
| 4 | ... | PCM | ... | ... | ... | ... |
| 5 | ... | PCM | ... | ... | ... | ... |
| 6 | ... | PCM | ... | ... | ... | ... |
| 7 | ... | JPEG | ... | ... | ... | ... |
| 8 | ... | ... | | | ... | ... |
| ... | ... | ... | | | ... | ... |

FIG.2

CONTENT REPRODUCING DEVICE AND CONTENT REPRODUCING METHOD

CROSS REFERENCES TO RELATED APPLICATIONS

The present invention contains subject matter related to Japanese Patent Application JP 2005-147105 filed in the Japanese Patent Office on May 19, 2005, the entire contents of which being incorporated herein by reference.

BACKGROUND OF THE INVENTION

1. Field of the Invention

The present invention relates to a content reproducing device and a content reproducing method which have a communication function based on, for example, TCP/IP (Transmission Control Protocol/Internet Protocol) and reproduce contents such as music and the like.

2. Description of the Related Art

In related art, there has been a conventional reproducing system in which a client device (hereinafter referred to simply as a client) requests a content stored in a server device (hereinafter referred to simply as a server) via a network. Data of the content requested by the client is received from the server, and the client reproduces the content.

In this kind of reproducing system, in streaming playback by which the client reproduces a content while receiving the data thereof, pausing playback of the content is realized in such a manner that the server stops transmission immediately before an image packet to pause. Release of the pause is realized by restarting transmission from the paused image packet (for example, see Japanese Patent Application Laid-Open Publication No. 8-138354).

SUMMARY OF THE INVENTION

However, in the conventional streaming playback, a pause cannot be taken before starting playback. Even when a user wants to start playback, playback cannot be started quickly. Therefore, for example, when the whole of one song is to be recorded, particular time to request the song from the server is required before starting playback, and so, an unnecessary soundless period is recorded.

The present invention has been made to overcome the problem as described above, and it is desirable to provide a content reproducing device and a content reproducing method which are capable of immediately starting reproduction by pausing reproduction before starting reproduction.

Therefore, according to the present invention, there is provided a content reproducing device which requests content data of a desired content from a server storing content data and reproduces the content while receiving the content data requested, the content reproducing device including: a communication section which requests desired content data from the server and receives the content data; a receive buffer which buffers the content data received by the communication section; a reproducing means for reading the content data buffered in the receive buffer and reproducing the content; and a control means for controlling reproduction of the content, wherein when a stop state in which reproduction of a content is stopped is switched to a pause state in which the reproduction of the content is paused, the control means lets the communication section request the content data from the server to receive the content data, lets the receive buffer a constant volume of the content data, and also lets the reproducing means stop reading the content data from the receive buffer.

Also according to the present invention, there is provided a content reproducing method including: step of requesting desired content data from a server storing content data; step of receiving the content data; step of buffering a constant volume of content data in a receive buffer; and step of letting a reproducing means stop reading the content data, the reproducing means configured to read the content data buffered in the receive buffer and reproduce the content data.

In the present invention, when a stop state in which reproduction of a content is stopped is switched to a pause state in which the reproduction of the content is paused, content data is requested from the server and is received therefrom. A constant volume of the content data is buffered by the receive buffer, and reading of the content data is stopped, thereby to establish the pause state. Therefore, when the pause state is released, quick reproduction is possible from the beginning of the content.

BRIEF DESCRIPTION OF THE DRAWINGS

FIG. 2 is a table showing an example of information concerning contents;

DETAILED DESCRIPTION OF THE PREFERRED EMBODIMENTS

A specific embodiment of the present invention will now be described in detail below with reference to the drawings. A content reproducing system given as a specific example includes a server and a client connected to each other via a network. The server delivers contents, and the client reproduces the contents. In particular, the system is based on a streaming playback in which the client reproduces content data while receiving the data, by use of network protocols called TCP (Transmission Control Protocol)/IP (Internet Protocol).

Figure 1:
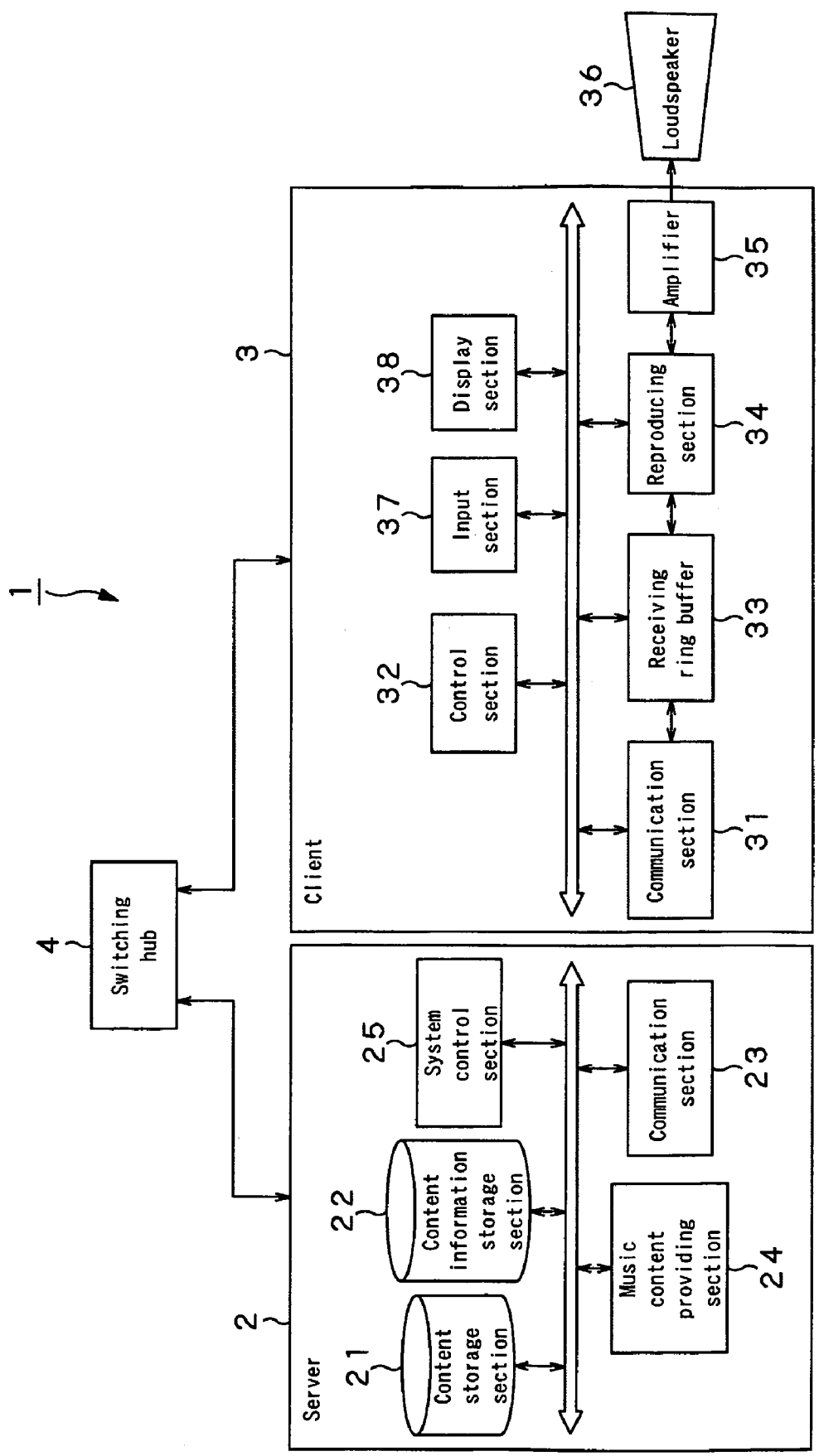
FIG. 1 is a block diagram showing configuration of a content reproducing system.

FIG. 1 is a schematic diagram showing a content reproducing system according to an embodiment of the present invention. This embodiment will be described as a system which reproduces music contents. The content reproducing system 1 includes a server 2 which stores music contents, a client 3 which reproduces the music contents, and a switching hub 4 which relays communication between the server 2 and the client 3. The content reproducing system 1 is connected by a LAN (Local Area Network) and performs communication according to TCP/IP. The TCP/IP divides network configuration into five hierarchical layers, i.e., a physical layer, network interface layer, internetwork layer, transport layer, and application layer. A network management method is settled for every layer.

The internetwork layer defines a mechanism which transfers packets toward a final address from a particular device, and also defines the format of packets transmitted via the internetwork. The packets transmitted via the internetwork are called IP packets. Each IP packet is constituted by an IP header and a data part. A transmission destination IP address and a transmission source IP address are described in the IP header. Based on these IP addresses, packets are transferred between the server 2 and the client 3.

The server 2 includes a content storage section 21, a content information storage section 22, a communication section 23, a music content providing section 24, and a system control section 25. The content storage section 21 stores music contents. The content information storage section 22 stores content information concerning music contents. The communication section 23 performs communication with the client 3. The music content providing section 24 provides music content providing service. The system control section 25 performs control of the whole server 2.

The content storage section 21 stores music contents. Information concerning plural music contents stored in the content storage section 21 is stored in the content information storage section 22. As shown in FIG. 2, names of the music contents, content types as formats of contents, sampling frequencies, numbers of channels, bit numbers, reproduction time lengths of the music contents, URLs of the music contents, and the like are described.

Figure 3:
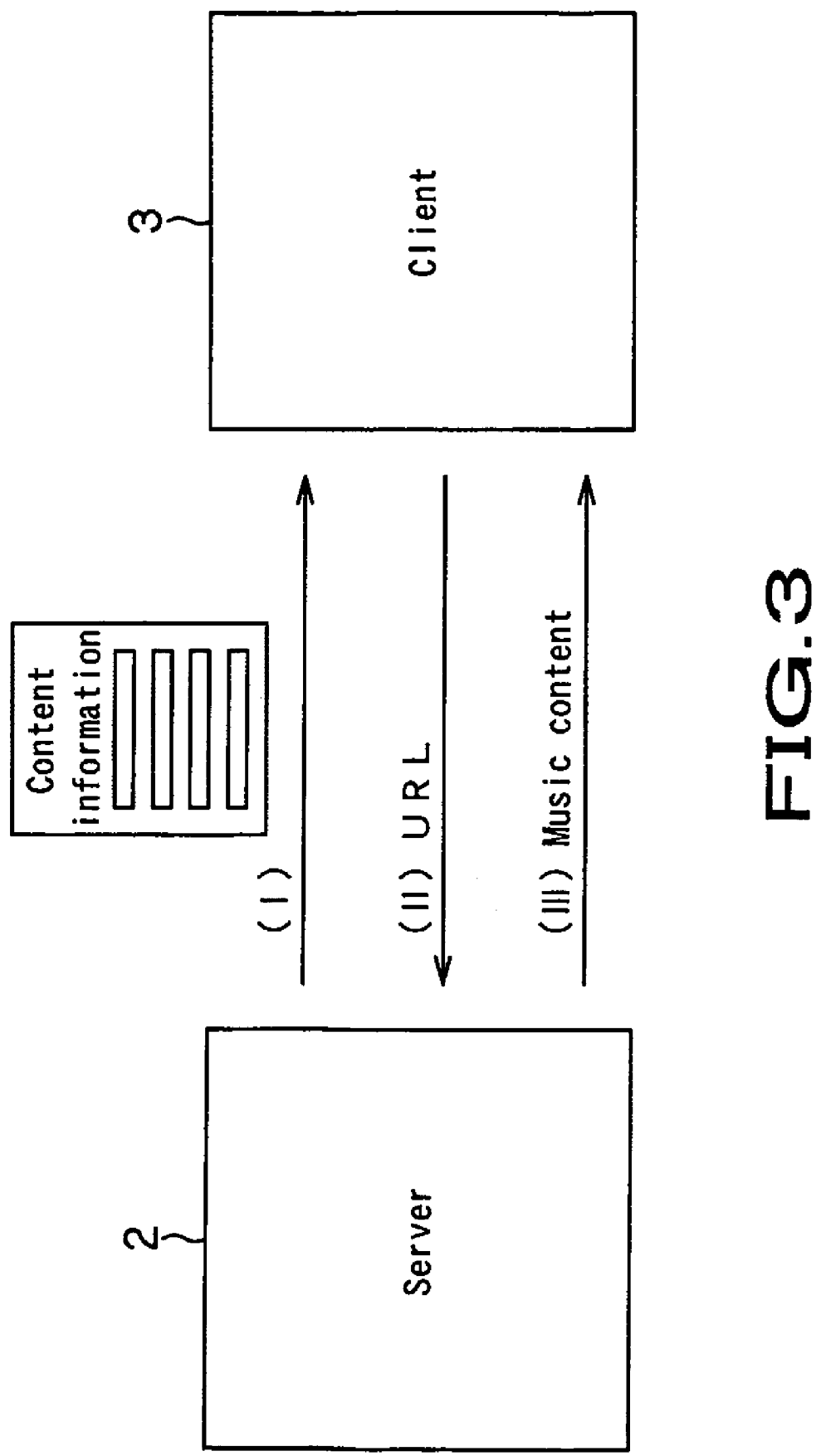
FIG. 3 is a diagram schematically showing processings of a providing section which provides music contents.

The music content providing section 24 provides the client 3 with the music contents stored in the content storage section 21. FIG. 3 schematically shows processings performed by the music content providing section 24. The music content providing section 24 first reads content information from the content information storage section 22. This content information is transmitted to the client 3 through the communication section 23 (I). URLs of music contents to be reproduced are written in the content information. The client 3 selects music contents to reproduce, from the content information, and transmits the URLs of the music contents to the server 2 (II). The music content providing section 24 reads out music contents, based on the URLs received from the client 3, and transmits the music contents to the client 3 (III).

The client 3 includes a communication section 31, a control section 32, a receiving ring buffer 33, a reproducing section 34, an amplifier 35, an input section 37, and a display section 38. The communication section 31 performs communication with the server 2. The control section 32 requests necessary data from the server 2 and controls reproduction thereof. The receiving ring buffer 33 temporarily stores music contents inputted from the server 2. The reproducing section 34 has a converter to convert a digital signal of a music content received from the server 2 into an analog signal. The amplifier 35 outputs an analog music signal to a loudspeaker 36. The input section 37 is constituted by keys or a remote controller to accept a manipulation input from a user such as a reproduction, stop, pause or the like.

The client 3 receives music contents from the server 2 and converts the digital signal of the received music contents into an analog signal, and reproduces the analog signal through the loudspeaker 36. The music contents transmitted from the server 2 are buffered in the receiving ring buffer 33. After a constant volume of the music contents is buffered in the receiving ring buffer 33, the music contents are outputted to the reproducing section 34. As a result of this, while music contents are being reproduced, sequential reproduction is achieved seamlessly between songs. The reproducing section 34 converts a digital music signal according to a PCM (Pulse Code Modulation) method into an analog music signal, and outputs the analog music signal to the amplifier 35. The analog music signal is amplified by the amplifier 35 and is then outputted from the loudspeaker 36.

Figure 4A:
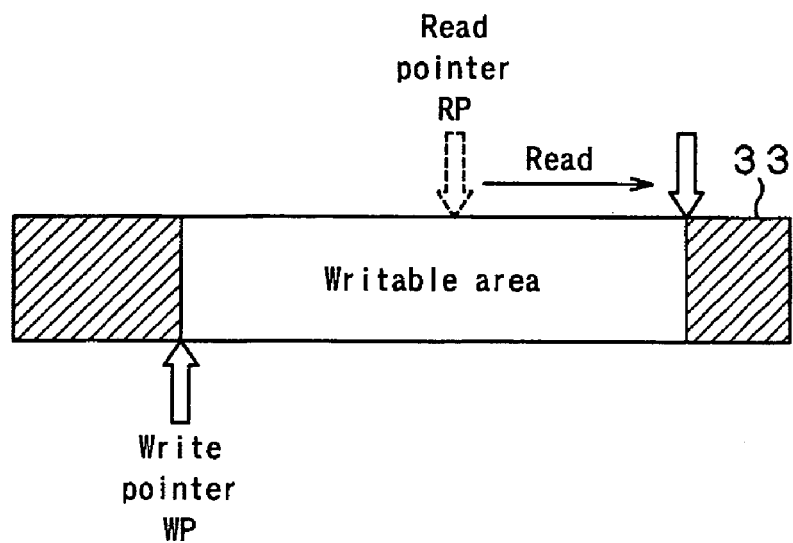
FIGS. 4A and 4B are views graphically showing read/write operations of a receiving ring buffer.
Figure 4B:
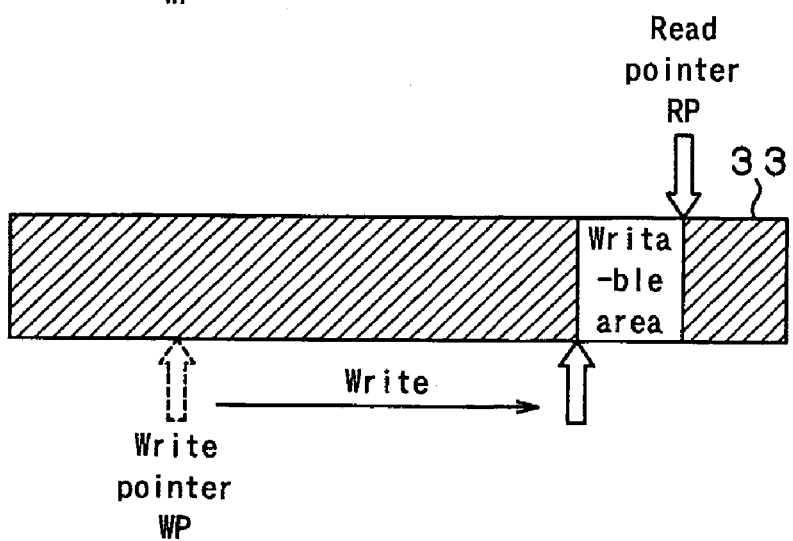

FIGS. 4A and 4B show write/read operations performed by the receiving ring buffer 33. A write pointer and a read pointer are set in the receiving ring buffer 33. FIG. 4A shows a state of read operation. Data reading is performed at even intervals, and music contents are outputted to the reproducing section 34 at a constant speed. After a music content is read by a read pointer, the area is made writable. FIG. 4B shows a state of write operation. In write operation, the write pointer moves within a writable area. If the writable area decreases, receiving of a signal is waited for until read operation proceeds. As a result of this, dependence on the communication speed can be reduced.

The switching hub 4 analyzes packets sent from the server 2 or client 3, detects an address, and transmits the packets to the server 2 or client 3.

Described next will be reproduction performed by the content reproducing system 1. At first, the control section 32 obtains content information from the server 2, and displays the content information on the display section 38. A user selects a song which the user wants to reproduce, from the displayed content information, and instructs reproduction by means of the input section 37. The control section 32 requests content data of the song from the server 2, about which the server 2 has received a reproduction instruction. The server 2 reads the content data of the song requested by the client 3 from the content storage section 21, and delivers the data to the client 3. The client 3 writes, into the receiving ring buffer 33, the content data delivered in units of packets from the server 2. In a stage after writing of a reproducible constant volume of content data is completed, reproduction is started. Thus, the client 3 reproduces a content while receiving content data.

With reference to flowcharts shown in FIGS. 5 and 6, a next description will be made of operation in case where, before the client 3 receives a music content from the server 2 and reproduces a song thereof, the client 3 instructs a pause to be taken in the song, in the content reproducing system 1 as described above.

Figure 5:
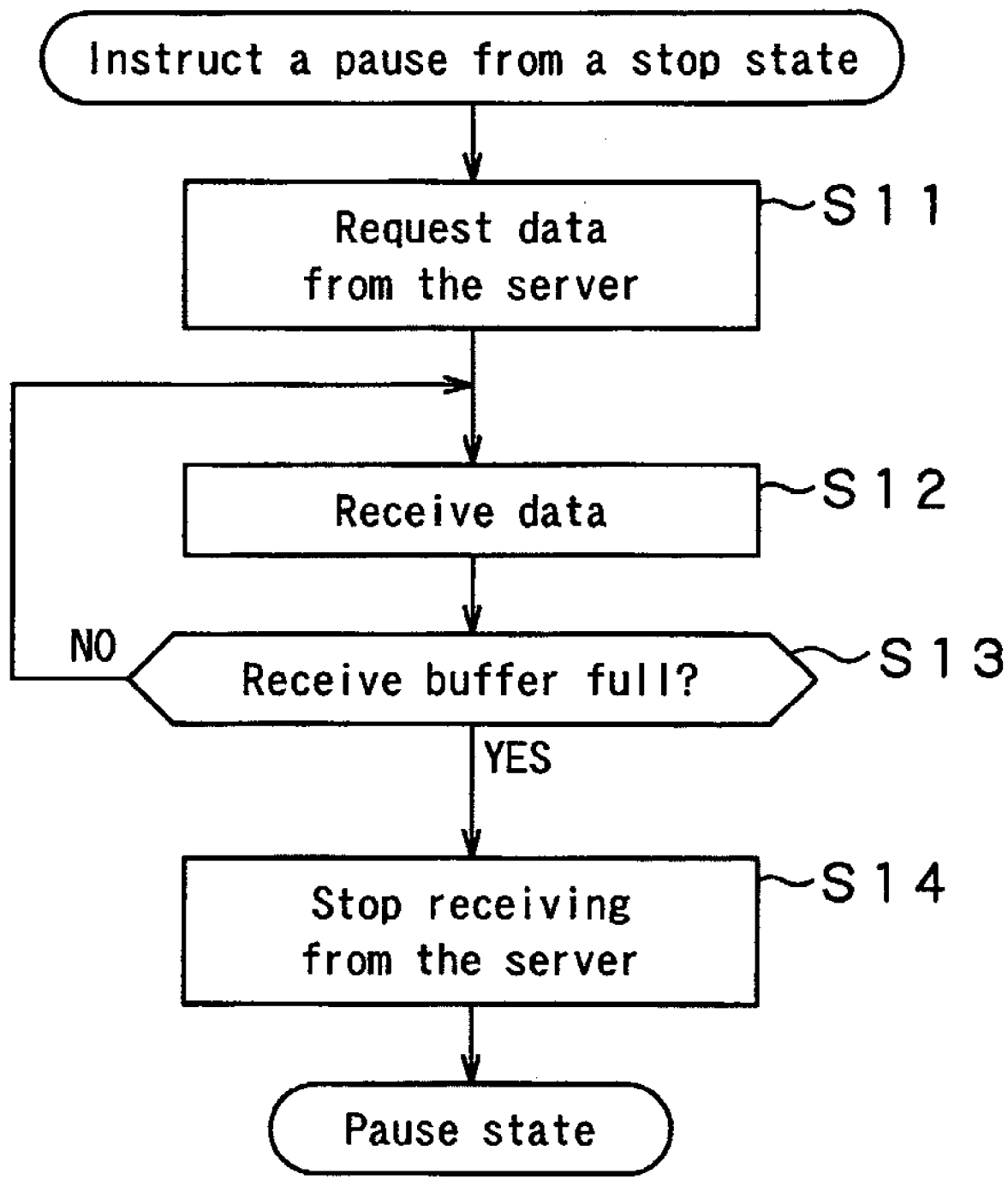
FIG. 5 is a flowchart showing pause operation on the side of a client.

In FIG. 5, the control section 32 sends data 0 to the reproducing section 34 to maintain a soundless state, in a stop state in which reproduction of a music content is stopped. If a pause instruction is given in this state, the control section 32 requests from the server 2 the content data of the song about which the pause instruction is given (step S11). The server 2 transmits the requested content data, and the client 3 receives the content data (step S12). The content data is sequentially buffered in the receiving ring buffer 33. After the receiving ring buffer 33 becomes full (step S13), the TCP window size is set to 0 to stop receiving the content data and to continue communication with the server 2 (step S14). The server 2 which has received this window notification of 0 cannot transmit new data before the window opens again. However, to maintain the connection, the server 2 transmits a probe segment to the client 3. The client 3 receives the probe segment, and notifies the server 2 of an order number to be expected next and a current window size (i.e., 0), thereby to continue the connection. If a reproducible constant volume of content data is buffered in the receiving ring buffer 33 while content data is being received, a reproduction button becomes active to enable reproduction to start. This state will be hereinafter described as a pause state.

Figure 6:
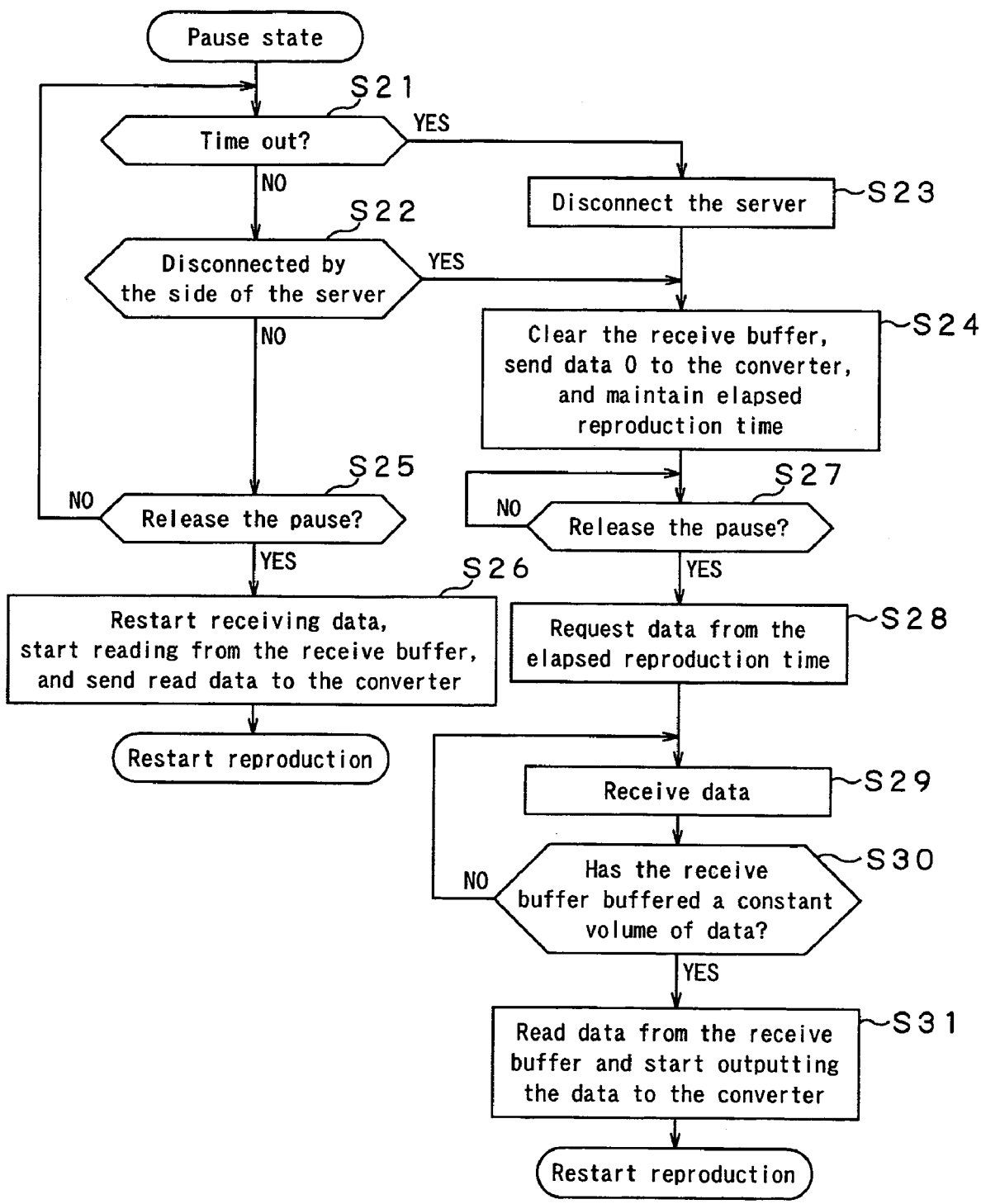
FIG. 6 is another flowchart showing pause operation on the side of a client.

Referring next to FIG. 6, in step S21, whether or not a constant time, e.g., 30 seconds have passed in the pause state described above is determined. During the pause state, communication with the server 2 is kept monitored to determine whether or not the communication is disconnected from the side of the server 2 (step S22).

In step S21, if the constant time has passed in the pause state, the control section 32 disconnects the communication with the server 2 (step S23), and goes to step S24. Otherwise, in step S22, if the communication is disconnected from the side of the server 2 during the pause state, the control section 32 also goes to step S24. In other words, when the communication between the server 2 and the client 3 is disconnected, the control section 32 goes to step S24.

In step S24, the control section 32 erases the content data buffered in the receiving ring buffer 33, and continues sending the data 0 to the reproducing section 34, to keep a soundless state. In addition, from the volume of data sent from the receiving ring buffer 33 to the reproducing section 34, sampling frequency, the number of channels, bit number, or the like thereof, an elapsed reproduction time which has elapsed up to now is calculated and maintained.

In steps S21 and S22, if communication is not disconnected from the side of the server 2 during the pause state and if the constant time after which the communication should be disconnected from the side of the client 3 has not yet passed, i.e., if the communication between the server 2 and the client 3 continues, the control section 32 goes to step S25 in which presence or absence of an instruction to release the pause state is detected.

In step S25, if an instruction to release the pause state is detected, reception of the content data from the server 2 is restarted, and the content data is read from the receiving ring buffer 33. The content data is outputted to the reproducing section 34 (in step S26). Reproduction is thereby restarted from the same position as the pause was started. In case of this pause release in step S26, the communication with the server 2 has not been disconnected, and the receiving ring buffer 33 has not been cleared. Therefore, reproduction can be immediately restarted from the same position. If no instruction to release the pause state is detected in step S26, the control section 32 returns to step S21.

In step S27, presence or absence of an instruction to release the pause state is detected in a state in which the communication between the server 2 and the client 3 has been disconnected (step S24). In step S27, if an instruction to release the pause state is detected, the control section 32 requests content data of packets including an elapsed reproduction time, from the server 2 (step S28). The server 2 transmits content data including reproducible packets from the elapsed reproduction time. The client 3 receives the content data (step S29). Further, a reproducible constant volume of the content data is buffered in the receiving ring buffer 33 (step S30). After the constant volume of the content data is buffered in the receiving ring buffer 33, the control section 32 reads content data from the receiving ring buffer 33, and outputs content data of the elapsed reproduction time to the reproducing section 34 (step S31). Reproduction is thereby restarted from the position at which the pause was taken.

If reproduction of a music content is thus switched from a stop state to a pause state, content data is requested from the server 2 and is received. A constant volume of the content data is buffered in the receiving ring buffer 33, and reading of the content data is stopped. A pause state is thereby made. When the pause is released, the music content can be quickly reproduced from the beginning. In other words, transition from a stop state to a pause state is possible without even once reproducing the music content. Therefore, a recording standby state can be used from the beginning of a music content.

In the embodiment described above, if the communication between the server 2 and the client 3 is disconnected, an elapsed reproduction time is calculated. However, the elapsed reproduction time can alternatively be calculated when a pause instruction is given.

Although the communication method of the content reproducing system 1 described above follows the TCP/IP, a different communication method may be used. Also the embodiment described above is configured to convert content data received from a server into an analog signal by the converter of the reproducing section 34. However, this configuration may be arranged so as to receive encoded content data from the server 2 and to decode and convert the data into an analog signal.

The present invention is not limited to the embodiment described above but can be applied to a reproducing device for video contents.

It should be understood by those skilled in the art that various modifications, combinations, sub-combinations and alterations may occur depending on design requirements and other factors insofar as they are within the scope of the appended claims or the equivalents thereof.

What is claimed is:

1. A content data reproducing device which requests content data of a desired content from a server storing the content data and reproduces a first portion of the content data while receiving a second portion of the content data, the content reproducing device comprising:
   communication means for requesting the content data from the server and for receiving the content data;
   a receive buffer which buffers the content data received by the communication means;
   reproducing means for reading the content data buffered in the receive buffer and for reproducing the content data; and
   control means for controlling reproduction of the content data, wherein when a stop state in which reproduction of a content is stopped is switched to a pause state in which the reproduction of the content is paused, the control means during the pause is for:
   permitting the communication means to request the content data from the server and to receive the content data,
   permitting the receive buffer to include a constant volume of the content data, and
   permitting the reproducing means stop reading the content data from the receive buffer,
   wherein, when the switch from the stop state to the pause state is detected, the communication means transmits a request for the content data to the server while the content data reproducing device stays in the pause state.

2. The content data reproducing device according to claim 1, wherein when the constant volume of the content data is buffered by the receive buffer, the control means is for:
   directing the communication means to stop reception of the content data from the server, while continuing a connection to the server.

3. The content data reproducing device according to claim 2, wherein when a reproduction instruction is accepted in a state in which the connection to the server is continued, the control means is for:
   permitting the communication means to restart reception of the content data, and
   permitting the reproducing means to start reading the content data from the receive buffer.

4. The content data reproducing device according to claim 2, wherein when the connection to the server is disconnected, the control means is for:
   erasing the content data buffered by the receive buffer, and sending soundless data to the reproducing means.

5. A content reproducing method comprising:
- requesting content data from a server storing the content data;
- receiving the content data;
- buffering a constant volume of the content data in a receive buffer;
- reading the content data buffered in the receive buffer;
- reproducing the read content data;
- detecting that a stop state in which reproduction of a content is stopped is switched to a pause state in which the reproduction of the content is paused;
- transmitting a request for the content data while staying in the pause state, when the switch is detected;
- receiving the content data during the pause state; and
- stopping the reading of the content data during the pause state.

6. A content data reproducing device which requests content data of a desired content from a server storing the content data and reproduces a first portion of the content while receiving a second portion of the content data, the content reproducing device comprising:
- a communication section which requests the content data from the server and receives the content data;
- a receive buffer which buffers the content data received by the communication section;
- a reproducing section which reads the content data buffered in the receive buffer and reproduces the content data; and
- a control section which controls reproduction of the content data, wherein when a stop state in which reproduction of a content is stopped is switched to a pause state in which the reproduction of the content is paused, the control section during the pause:
  - permits the communication section to request the content data from the server and to receive the content data,
  - permits the receive buffer to include a constant volume of the content data, and
  - permits the reproducing section to stop reading the content data from the receive buffer,
- wherein, when the switch from the stop state to the pause state is detected, the communication section transmits a request for the content data to the server while the content data reproducing device stays in the pause state.

7. The content data reproducing device according to claim 6, wherein when the constant volume of the content data is buffered by the receive buffer, the control section directs the communication section to stop reception of the content data from the server, while continuing a connection to the server.

8. The content data reproducing device according to claim 7, wherein when a reproduction instruction is accepted in a state in which the connection to the server is continued, the control section:
- permits the communication section to restart reception of the content data, and
- permits the reproducing section to start reading the content data from the receive buffer.

9. The content data reproducing device according to claim 7, wherein when the connection to the server is disconnected, the control section:
- erases the content data buffered by the receive buffer, and
- sends soundless data to the reproducing means.

* * * * *